INVENTOR
GLEN C. BULL

INVENTOR
GLEN C. BULL

ATTORNEYS

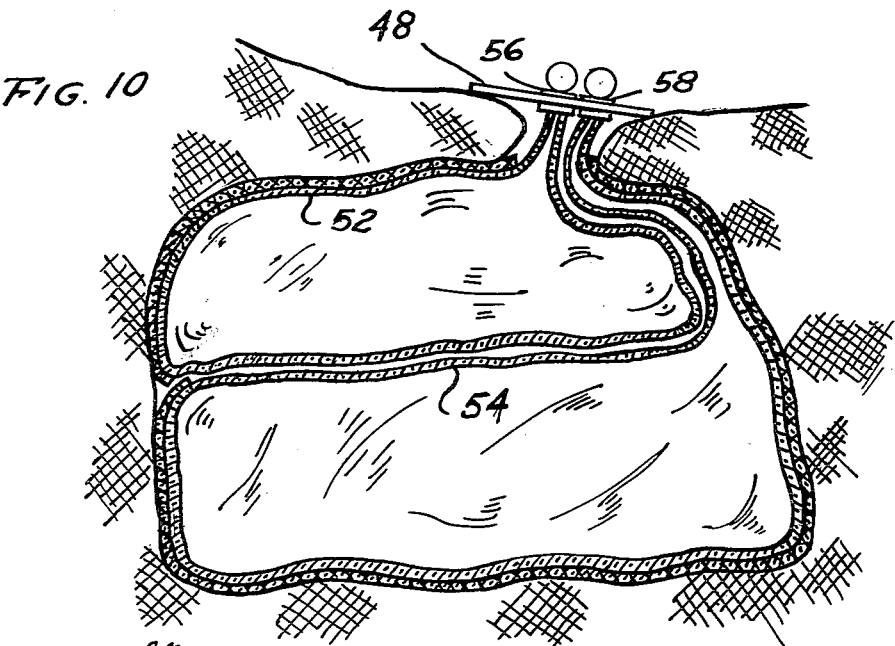
FIG. 10
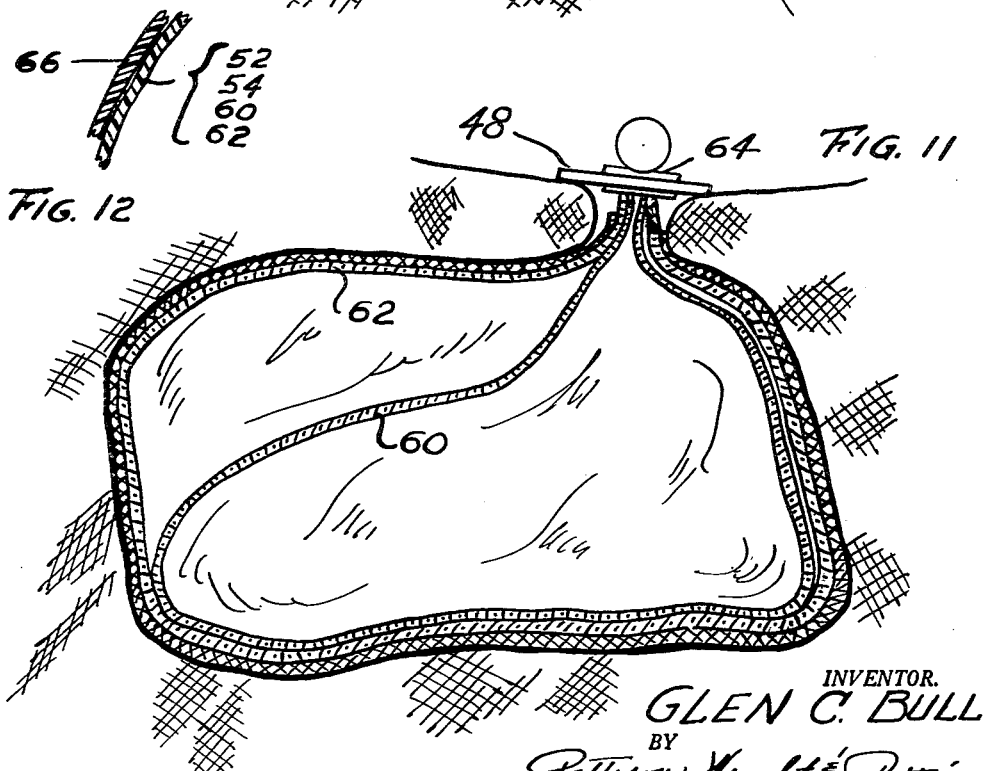
FIG. 12
FIG. 11
INVENTOR.
GLEN C. BULL
BY
Pattison Wright & Pattison
Attorneys

United States Patent Office

3,111,371
Patented Nov. 19, 1963

3,111,371
METHODS AND APPARATUS FOR CONDITIONING HOLLOW ARTICLES AGAINST CORROSION AND STORING FLUENT MATERIALS
Glen C. Bull, 2800 Quebec St. NW., Washington, D.C.
Filed Dec. 8, 1961, Ser. No. 160,690
14 Claims. (Cl. 21—2.5)

The present invention relates to packaging and storing and more particularly and specifically to methods and apparatus for conditioning enclosed articles and material in corrosion inhibiting and contaminate free condition. This application is a continuation-in-part of co-pending application Ser. No. 854,180, filed November 19, 1959, now abandoned, which was a division of application Serial No. 255,675, filed November 9, 1951, now United States Letters Patent No. 2,914,377.

Certain prior methods and apparatus have been used for the purpose of conditioning articles and materials against corrosion and contamination while in a stored condition for unlimited periods of time.

Certain of these prior methods and apparatus have reatied to conditioning enclosed articles against interior corrosion by means of evacuating moisture and oxygen bearing mediums from within the articles and subsequently sealing the articles in substantially air-tight condition so as to prevent ingress of additional moisture and oxygen mediums.

In evacuating these corrosion including mediums from within a sealed or sealable article vacuum pumps and the like have been used to draw a substantially complete vacuum within the article prior to the exterior sealing thereof. Such methods and apparatus are inherently impractical and unsuccessful by reason of the recognized inability to draw a complete vacuum within any sealed enclosure whereby moisture and corrosive element bearing mediums are naturally present at all times within such enclosures.

Additionally, such evacuation methods of removing corrosive bearing elements from within enclosed articles is only practical where the strength and construction of the article is sufficient to withstand the external pressures which are created by evacuation without damage to the article. Thus there is a substantial limitation in the possible application of this method.

Other prior methods and apparatus have included the steps in conditioning the interior of a sealable container or enclosure of forcing under pressure an inert medium into the enclosure in order to expel corrosive element bearing mediums therefrom and to replace such mediums with the inert materials.

It has been found that regardless of the methods of replacement by inert mediums of corrosive element bearing mediums from within an enclosed article, there is always an intermixture of the two mediums and hence a resultant contamination of the inert mediums which results in the presence at all times of corrosive element bearing mediums which are free to attack the interior portions of the article.

Still other prior methods have contemplated a combination of evacuation steps for removal of moisture and corrosive element bearing mediums from enclosed articles or containers together with the steps of coating or conditioning the interior surfaces of the article with certain prior known corrosion inhibiting agents usually in grease or petroleum form.

In these latter prior methods the inability to draw a vacuum prevents completely satisfactory removal of corrosive element bearing mediums while the coating of the interior surfaces of the article presents a substantial problem at any time it becomes desirous of placing the article in use when such materials have to be removed.

Still other prior art methods and apparatus have contemplated the use of rigid collapsible structures, such as telescopic tank sections, for storage of gas and other fluent material in contaminate free condition so that it is readily stored in or discharged from the rigid container.

It is an overall object of this invention to provide novel and improved methods and apparatus for the storage of articles and materials in corrosion free, contamination free condition.

It is therefore a general object of the present invention to provide methods and apparatus for the conditioning of the interior of sealed or sealable articles or containers for the preventing and inhibition of corrosion to the interior surfaces of such articles.

Another object of the present invention is the provision of methods and apparatus for the purpose described which substantially eliminate all the disadvantages and problems inherent in prior methods and apparatus.

A further object of the present invention is to provide methods and apparatus for the conditioning of the interior of sealed or sealable articles which permits a substantially complete elimination of all corrosive element bearing mediums from the interior of the container prior to the sealing of the same.

Still a further object is to provide methods and apparatus for the purpose described which permits after evacuation of the interior of sealed or sealable articles the introduction of inert mediums thereinto without possibility of intermixture of the corrosive element bearing mediums and the inert mediums and the subsequent contamination thereby of the inert mediums.

Still another important object of the present invention relates to the provision of methods and apparatus which permit the substantial elimination of all corrosive element bearing medium from within a sealed article together with a provision of a constant circulation of an inert medium through said sealed article after elimination of said corrosive element bearing medium.

A further object of the instant invention lies in the provision of a method and apparatus for the evacuation or elimination of substantially all of the corrosive element bearing medium from within a sealed container or article without creation of any reduction of pressure within the container thus eliminating any possible damage to the container or article from external pressures during or after the evacuation or elimination steps.

Yet another object of this invention is the provision of methods and apparatus for conditioning the interior of sealed articles or containers against corrosion which eliminates the necessity of applying coatings to the interior surfaces of the article thereby maintaining the article at all times in a condition of quick availability for use without the necessity of time consuming and laborious removal of corrosion inhibiting agents and coatings.

Still a further object of this invention lies in the provision of new and improved methods and apparatus for the storage of gas and other fluent material in contamination free condition and in such manner that they are readily accessible for withdrawal at regular or intermittent flow rates.

Other objects of the present invention are inherent in the simplicity of the methods involved and in the lack of expense incident to the apparatus used and in the performance of the methods involved.

Still additional objects and advantages of the present invention and of the methods and apparatus constituting parts thereof will become readily evident to those skilled in the art when the following description is read in the light of the accompanying drawings and as are defined within the scope of the appended claims.

The nature of the present invention may be stated in general terms as including a method for conditioning the interior of a sealed article against corrosive action by corrosive element bearing mediums which includes the steps of sealing the article leaving a single exhaust opening, inflating a flexible bag within the article to a position where it completely fills the article thereby evacuating or eliminating all free medium normally present therein through said exhaust opening, introducing an inert medium through said exhaust opening into said article with simultaneous deflation of said flexible bag to completely deflate said bag and fill said article with said inert medium, and removing said bag through a sealed air lock arrangement from the interior of the article and sealing said air lock arrangement, and the additional step of providing continuous circulation of said inert medium into and out of said sealed article.

The further general nature of the present invention embodies the use of flexible, impervious containers confined within rigid natural or man-made bounds for the reception and storage of gas and other fluent material.

For the purposes of the present disclosure and description of the methods and apparatus constituting the present invention and to enable a clear understanding thereof by a person skilled in the art the article illustrated in the accompanying drawings as an article to be conditioned against interior corrosion is shown and described as a cylindrical tank capable of air-tight sealing. However, it is fully contemplated that any article be it stationary, vehicular or the like may be conditioned by the methods and apparatus taught herein with proper attention given to exterior sealing against the ingress of corrosive element bearing mediums.

Thus, turning now to the accompanying drawings in which like numerals designate similar parts throughout:

FIG. 10 is a view similar to FIG. 8 of still another embodiment.

FIG. 11 is a view similar to FIG. 8 of still another embodiment, and

FIG. 12 is an enlarged fragmentary section taken on line 12—12, FIG. 11.

Figure 1:
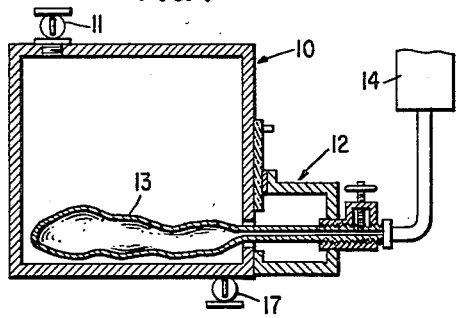
FIG. 1 is a side elevation of the article to be conditioned disclosing the inflatable bag, air lock mechanism and exhaust opening.
Figure 2:
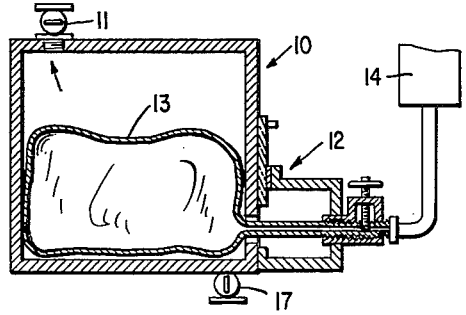
FIG. 2 is a side elevation in section of the article to be conditioned illustrating the inflatable bag in an intermediate stage of inflation.
Figure 3:
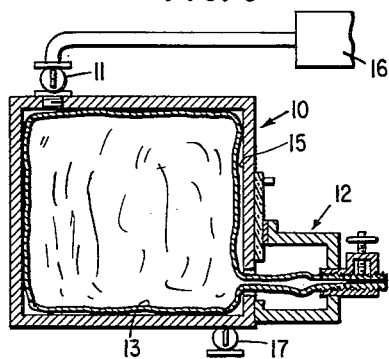
FIG. 3 is a figure similar to FIG. 2 with the bag in a fully inflated condition with the inert medium source being connected to the exhaust.
Figure 4:
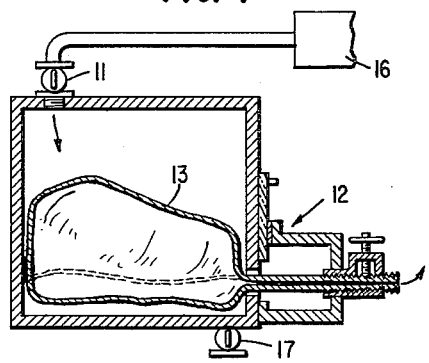
FIG. 4 is a side elevation in section similar to FIG. 3 illustrating an intermediate stage of inert medium ingress and a partial bag deflated condition.

In the drawings, 10 generally designates a sealable article illustrated as a cylindrical tank provided with an exhaust outlet or fitting 11 and an air lock fitting generally designated at 12.

In order to condition the interior of the tank 10 against corrosion during a long period of storage an inflatable bag 13 of a suitable flexible plastic or like material is placed within the container through the air lock fitting 12 and with the exhaust fitting 11 in an open condition the bag 13 is inflated with air or the like from a suitable source 14.

As the bag, which is initially capable of expansion to a size somewhat greater than the interior of the tank 10, is inflated its side walls will come to coincide as at 15 with the interior surfaces of the tank until such time as the bag will completely fill the tank having exhausted all of the natural contents of the tank outwardly through the exhaust fitting 11.

Once the bag has been inflated to a point of completely filling the tank interior a source 16 of inert material such as carbon dioxide, nitrogen, Freon or the like is coupled to the exhaust fitting 11 and the inert material is forced inwardly of the exhaust fitting into the interior of the tank 10.

Simultaneously with the ingress of the inert material into the tank the pressure is released on the contents of the bag 13 by disconnecting it from its pressured source 14 to permit the displacement of the bag contents from within the tank at the same rate of exhaust as the rate of ingress of the inert material into the tank.

When the inert material has completely filled the tank and has completely deflated the bag 13, the inert material is maintained under pressure while the bag 13 is removed from within the tank through the air lock fitting 12 which prevents any possible ingress of corrosive element bearing medium from without the tank. Once the bag has been removed through the air lock fitting 12 such fitting is closed and sealed and the exhaust fitting 11 may also be closed and sealed to completely seal the inert medium within the tank where it will condition the tank against any possible interior corrosive action.

Figure 5:
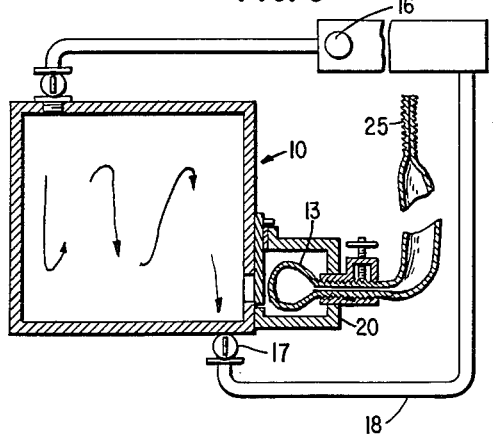
FIG. 5 is a side elevation in section illustrating an arrangement for continuous circulation of an inert medium after removal of the inflatable bag.

Turning to FIG. 5 there is illustrated an arrangement of apparatus which includes a fitting connection 17 coupled to the air lock fitting 12 which forms a conduit from adjacent the air lock fitting 12 back to the source of the inert material. The utilization of a return line 18 as shown and described provides together with the inert material source and its connection with the exhaust fitting 11 a continuous circulation system for the inert material through the tank 10 providing a substantially increased inhibition to interior corrosion of the tank by corrosive elements.

Figure 6:
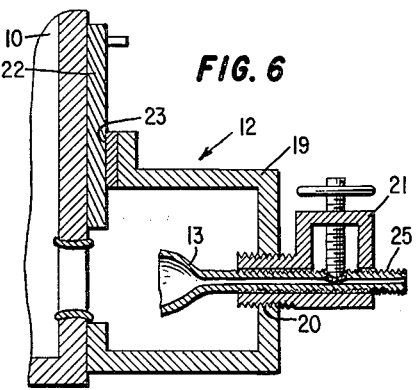
FIG. 6 is a detailed view of a possible air lock arrangement for removal of the inflatable bag.

Referring now to FIG. 6 there is shown in detail one contemplated arrangement for an air lock fitting to be attached to the tank for insertion and removal of the inflatable bag 13 relative to the tank with a constant maintenance of an air seal at said fitting to prevent the ingress of any corrosive element bearing medium from outside the tank.

In the air lock arrangement disclosed in FIG. 6 there is provided exteriorly of the air lock fitting 12 on the container 10 an air-tight housing 19 which is provided opposite the fitting 12 with an access door 20 which carries substantially centrally thereof a valve member 21 through which the bag 11 carrying the inflation opening therein is drawn outwardly from the tank. A sliding hatch arrangement 22 is carried on the side of the tank 10 to move vertically in air-sealed guides 23 to open and closed positions in respect to the fitting 12 in the tank side 10.

Accordingly the bag may be inflated by opening the valve member 21 to permit the injection of air into inflation opening in the bag 11 to cause it to expand within the tank 10. In order to remove the bag 11 from the tank with the simultaneous ingress of the inert medium thereinto the valve member 21 is placed in an open position to permit the escape of atmosphere from within the bag and once the bag has deflated to a collapsed position it may be drawn outwardly from the tank into the air-tight housing 19 whereupon the hatch closure 22 is moved down to close the fitting 12 in the tank side. Once the bag is contained within the housing 19 the access opening 20 may be opened without fear of ingress of atmosphere into the tank and the bag may be removed from the housing for use in a second tank.

A further contemplation of the present invention includes the periodic addition of a granular corrosion inhibiting agent such as the commercially available vapor phase inhibitors to the circulating inert medium for the purpose of presenting these inhibitors to the interior surfaces of the tank 10.

Figure 7:
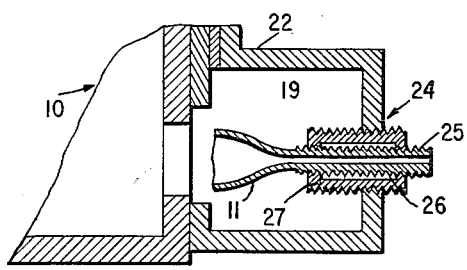
FIG. 7 is a detailed view illustrating a second possible bag removal arrangement modifying FIG. 6.

In the modified air lock construction shown in FIG. 7 a pull-through coupling designated at 24 is threadedly mounted in the outer wall of the air lock housing 19 which coupling threadedly receives a threaded valved fitting 25 carried in the mouth of the inflatable bag 11, said pull-through coupling including internal threads 26 and a smooth turned-over restricted throat 27 through which the bag is tightly drawn outwardly from the tank 10 in substantially air-tight condition therewith into and through the air lock housing 19 whereupon the hatch 22 may be closed to seal the tank without having permitted the ingress into the tank of any contaminated corrosive element bearing mediums.

Additionally, it is further contemplated that the supply pressure of the inert medium may be alternately varied to produce a pumping action within the tank for the purpose of causing the inert medium and any inhibiting agents carried thereby to circulate and distribute themselves more widely and uniformly within the interior of the tank.

It is additionally contemplated that by use of the methods generally disclosed herein that an ideal arrangement is provided for the control and operation of gas storage tanks such as are used commercially for the stockpiling of natural, artificial gas or the like. The application of this method to such a use would include the construction of a gas storage tank with an air lock mechanism for the air-tight insertion and removal of a flexible container within the tank and a combination exhaust and supply fitting on the tank. In operation the exhaust fitting would be opened and the bag inflated to expel air from within the tank, and with the bag in a fully inflated condition, the source of natural or artificial gas would be connected to the combined inlet and exhaust fitting, the pressure on the inflated bag released simultaneously with the pumping of the natural gas into the storage tank. When the bag is fully deflated the storage tank would be substantially filled with gas at which time the bag could be removed through the air lock arrangement without loss of the stored material, or the bag could be left in a deflated condition in the bottom of the tank for subsequent reuse.

In this operation and this contemplated use of the herein disclosed methods, a quick and inexpensive means is provided for readying storage containers for the reception of gaseous mediums.

Figure 8:
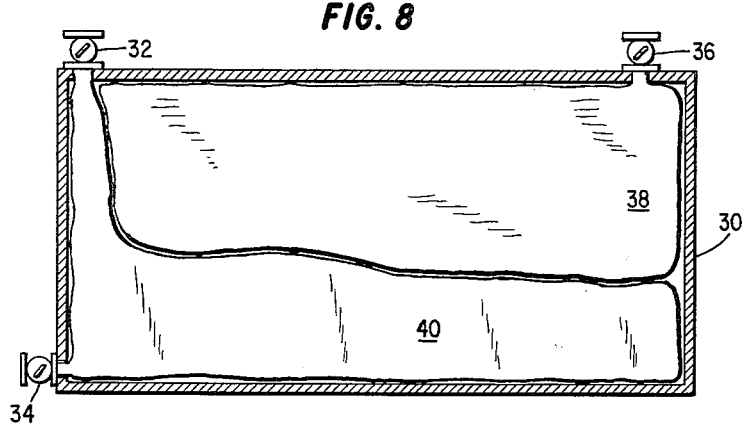
FIG. 8 is an elevational section of a modified embodiment.

As is further seen in FIG. 8 of the drawings the present inventive concepts are advantageously adapted to the protection of liquid or gas storage vessels where the corrosive elements normal to atmospheric vent air and the characteristics of the stored material can both have damaging effect on the vessel interior. In this form a storage vessel 30 is provided with an inlet 32, an outlet 34 and an atmospheric vent 36. A flexible container 38 is coupled to the vent 36 with the container located within the storage vessel. A second storage container 40 of flexible character is housed in the vessel and coupled in communication with both the inlet 32 and the outlet 34.

In use of the foregoing arrangement of apparatus, the outlet 34 is closed and the storage container filled through the inlet to some volume within the capacity of the vessel. As the storage container is filled the atmosphere in the container 38 is vented through 36 as the container is collapsed.

When the vessel outlet is opened the vent 36, open to the atmosphere, permits volumetric replacement with the container 38, within the vessel 30 of the stored material discharged from outlet 34. Further, where required a pressure source connected to vent 36 will permit pressure discharge of the stored materials.

From the foregoing it is seen that the stored material and the free atmosphere are both fully contained in the flexible containers 38 and 40 out of contact with the vessel interior.

Figure 9:
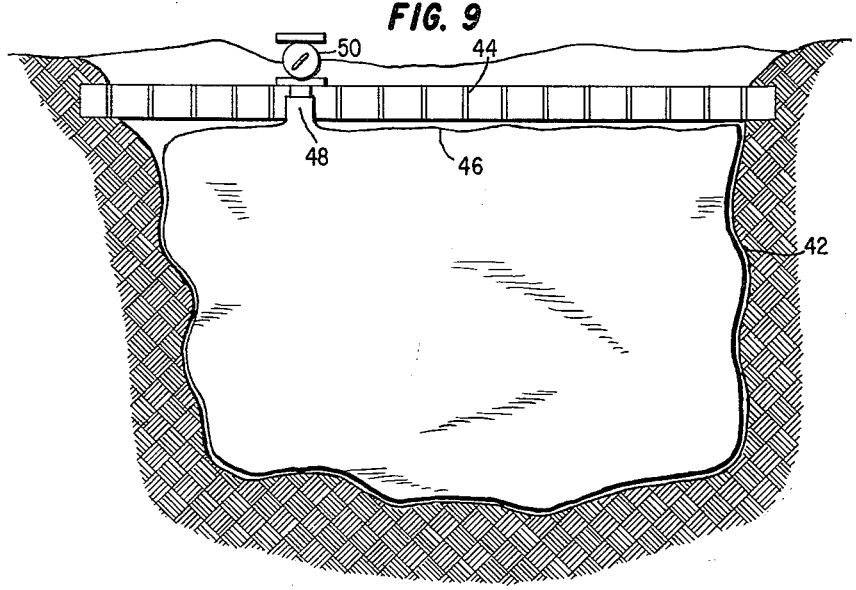
FIG. 9 is a view like FIG. 8 of still another embodiment.

In FIG. 9 there is shown a further form of the instant invention applied in the conversion of a quarry 42 or like depression into a storage vessel for fluent material such as natural gas or the like. In this form a spider grid or framework 44 is constructed to bridge or cover the open top of an earth depression such as a quarry, open pit mine or the like. Then a large flexible container 46 is worked into the depression beneath the grid and a mounted opening 48 is connected into a valved fitting 50 anchored on the grid. Thereafter natural gas, helium, nitrogen or the like may be pumped into the container and stored until needed. Additional outlet fittings may be provided to draw off quantities of the stored material as needed.

From the foregoing it may be seen that apparatus and methods for conditioning the interior of a hollow enclosed article against corrosion have been provided which satisfy all those objects and advantages heretofore set forth. While certain constructions and steps have been specifically disclosed and referred to herein, it is intended that these disclosures be for the purpose of illustration only and not for the purposes of limitation since the principles of the present invention are capable of broad application and utility and the scope of the heretofore disclosed invention and discoveries are to be limited only by the hereinafter appended claims.

In FIG. 10 of the drawings there is illustrated a modification of the method and apparatus of FIG. 9 wherein the single container is replaced by two flexible containers 52 and 54 in side by side, or top to bottom relationship within the earth depression and beneath the framework 44. Each container is provided with an access fitting, 56 and 58 respectively, which may be valved to permit filling and emptying of the container.

The apparatus of this embodiment, similar to that of FIG. 8, permits one container to be connected to a source of, or discharge for, a fluent material to be stored and dispensed, while the second container is connected to a pressure and relief source. By this arrangement one container may be relieved to permit filling of the other, or, it may be put under pressure to expel fluent from the other.

In FIG. 11 of the drawings a modification of the apparatus of FIG. 10 is shown wherein, again, two containers are used where one, 60, is contained within the other, 62. In this arrangement a single valved fixture, 64 may be utilized to control filling and venting of each of the two containers independently for the purposes hereinbefore enumerated.

FIG. 12 illustrates a method by which the flexible containers may be reinforced with a protective cushion of spongy material to protect them against puncture and abrasive wear when confined in underground caverns, depressions or the like. The spongy material 66 may be applied by heat, cement or the like to the container skin over its entire exterior or in limited areas, as the demands may appear.

Utilization of these latter described concepts, FIGS. 9–12, would permit gas or fluent material storage underground or underwater with natural or manufactured pressures serving to assist in dispensing of the material, and to permit greater volumes to be stored than would be possible under conditions of atmospheric pressure.

The scope of these latter concepts is established by the appended claims, there being no intention to limit these concepts beyond the requirements of the prior art.

What I claim is:

1. Apparatus for conditioning hollow articles against corrosion including a valved exhaust fitting affixed to the exterior of the article in communication with the hollow interior thereof, a second fitting having a sealed closure means, a flexible container insertable in said second fitting and inflatable within the hollow of the article to expel substantially all of the free atmosphere therefrom through the exhaust fitting, a source of inert medium under pressure, conduit means detachably connecting the source of inert medium to the exhaust fitting to permit the inert medium to enter the hollow of the article with deflation and withdrawal of the flexible container therefrom through the second fitting.

2. Apparatus of the type described in claim 1 wherein the second named fitting is of an air lock type to permit the removal of the flexible container from the hollow of the article without ingress of free atmosprere thereinto.

3. Apparatus of the type defined in claim 1 wherein a third fitting is applied to the article in communication with the hollow thereof, and conduit means detachably connecting said third fitting to said source of inert medium providing a return duct thereto from said hollow article whereby a continuous circulation of an inert medium through said hollow article can be produced.

4. A method of conditioning a hollow article against corrosion including inflating a flexible container within the hollow of the article to expel the free atmosphere therefrom, connecting the container to a source of an inert medium under pressure, deflating and withdrawing the flexible container from said hollow article with a simultaneous provision of a supply of inert medium thereto, and sealing said inert medium in said hollow article when said inflatable container has been removed therefrom and replaced by said inert medium.

5. A method of conditioning a hollow article against corrosion including inflating a flexible container within the hollow of the article to expel the free atmosphere therefrom, connecting the container to a source of an inert medium under pressure, deflating and leaving the flexible container in said hollow article with a simultaneous provision of a supply of inert medium thereto, and sealing said inert medium in said hollow article when said inflatable container has been deflated therein and its volume replaced by said inert medium.

6. A method of conditioning a hollow article against corrosion including inflation of a flexible container within the hollow of the article to expel free atmosphere therefrom, connecting the hollow of the article to a pressured source of an inert medium, simultaneously supplying an inert medium to the hollow of said article with deflation and removal of said flexible container therefrom, providing a return passage from the hollow of said article to said source of inert medium to provide for a continuous circulation of said medium through the hollow of said article when said flexible container has been removed therefrom.

7. A method as defined in claim 6 including the steps of periodically injecting into said inert medium supply a granular corrosion inhibiting agent, and of fluctuating the supply pressure of said inert medium to said hollow article to produce a pumping action within the hollow of the article for the uniform and complete distribution of the inert medium and the inhibiting agent within the hollow of the article.

8. A method of protecting the interior of a storage vessel having inlet, outlet and atmospheric vent fittings, including the steps of lining the vessel with a flexible container communicating with the inlet and outlet fittings of the vessel, and placing a deflated container in the vessel outside of the first container, and placing the second container in communication with the atmospheric vent on the vessel.

9. In a storage vessel for fluent materials including a rigid container having inlet, outlet and atmospheric vent fittings, a flexible walled container in said vessel having the interior in communication with the inlet and outlet fittings, and a second flexible walled container in said vessel outside the first container and having its interior in communication with the vent fittings.

10. In combination with a rigid confining receptacle, a pair of flexible walled containers within the receptacle each having an internal volume substantially equalling the volume of the receptacle, and fittings on each flexible container providing fluent ingress and egress thereto and therefrom.

11. A combination as defined in claim 10 wherein the fitting of one of said flexible containers is in communication with means for increasing and decreasing the internal pressure thereof.

12. A combination as defined in claim 10 wherein one of said flexible containers is housed within the other, and the fitting of said inner container is accessible through the fitting of the outer container.

13. A combination as defined in claim 10 wherein said flexible containers are provided on the exterior thereof with a spongy cushion.

14. A method of storing a fluent material in an underground cavity comprising, confining said material within a flexible container located and retained in said cavity, positioning a second flexible container within the cavity adjacent said first container, and selectively placing said second container under internal pressure to control the external pressure on the first container.

No references cited.